United States Patent
Gupte et al.

(10) Patent No.: US 7,109,852 B2
(45) Date of Patent: Sep. 19, 2006

(54) VEHICLE OCCUPANCY INTRUDER SECURITY SYSTEM

(75) Inventors: Sunil K. Gupte, Livonia, MI (US); Pawel W. Sleboda, Bloomfield Hills, MI (US)

(73) Assignee: Lear Corporation, Southfield, MI (US)

( * ) Notice: Subject to any disclaimer, the term of this patent is extended or adjusted under 35 U.S.C. 154(b) by 119 days.

(21) Appl. No.: 10/766,067

(22) Filed: Jan. 28, 2004

(65) Prior Publication Data

US 2005/0162260 A1    Jul. 28, 2005

(51) Int. Cl.
*B60R 25/10* (2006.01)
(52) U.S. Cl. .......................... 340/426.26; 340/426.15; 340/541; 307/10.2
(58) Field of Classification Search .......... 340/426.26, 340/426.18, 426.15, 541, 527, 528; 307/10.1, 307/10.2; 180/287
See application file for complete search history.

(56) References Cited

U.S. PATENT DOCUMENTS

| | | | | |
|---|---|---|---|---|
| 4,887,064 A | * | 12/1989 | Drori et al. | 340/5.23 |
| 4,940,964 A | * | 7/1990 | Dao | 340/438 |
| 5,315,285 A | * | 5/1994 | Nykerk | 340/426.26 |
| 5,381,128 A | * | 1/1995 | Kaplan | 340/426.26 |
| 5,382,948 A | * | 1/1995 | Richmond | 340/426.28 |
| 5,535,844 A | * | 7/1996 | Samford | 340/426.28 |
| 5,719,551 A | * | 2/1998 | Flick | 340/426.25 |
| 5,739,747 A | * | 4/1998 | Flick | 340/426.22 |
| 5,870,020 A | * | 2/1999 | Harrison, Jr. | 340/426.26 |
| 6,049,281 A | * | 4/2000 | Osterweil | 340/573.4 |
| 6,088,642 A | | 7/2000 | Finkelstein et al. | |
| 6,107,914 A | * | 8/2000 | Greene | 340/426.25 |
| 6,157,293 A | * | 12/2000 | Bonhoure | 340/426.26 |
| 6,220,627 B1 | | 4/2001 | Stanley | |
| 6,243,022 B1 | * | 6/2001 | Furukawa | 340/825.72 |
| 6,556,135 B1 | * | 4/2003 | Attring et al. | 340/426.18 |
| 6,583,715 B1 | | 6/2003 | Benzie et al. | |
| 6,587,047 B1 | * | 7/2003 | Nilsson et al. | 340/552 |
| 6,624,758 B1 | * | 9/2003 | Omata et al. | 340/426.36 |
| 6,631,096 B1 | * | 10/2003 | Gillis et al. | 340/552 |
| 6,650,236 B1 | | 11/2003 | Ghabra et al. | |
| 6,762,676 B1 | * | 7/2004 | Teowee et al. | 340/426.1 |
| 6,768,420 B1 | * | 7/2004 | McCarthy et al. | 340/573.1 |
| 6,940,397 B1 | * | 9/2005 | Le Mire | 340/426.26 |
| 2002/0025805 A1 | | 2/2002 | Reimus | |
| 2002/0028663 A1 | | 3/2002 | Tang | |
| 2002/0080014 A1 | * | 6/2002 | McCarthy et al. | 340/426 |
| 2002/0101335 A1 | | 8/2002 | Ghabra et al. | |
| 2002/0109580 A1 | | 8/2002 | Shreve et al. | |
| 2003/0098781 A1 | | 5/2003 | Baset | |
| 2003/0171537 A1 | | 9/2003 | Halazonetis et al. | |
| 2005/0099275 A1 | * | 5/2005 | Kamdar et al. | 340/426.18 |

* cited by examiner

*Primary Examiner*—Daniel Wu
*Assistant Examiner*—Eric M. Blount
(74) *Attorney, Agent, or Firm*—MacMillan, Sobanski & Todd, LLC

(57) ABSTRACT

A vehicle security system includes a monitoring device for sensing the presence of a body within the vehicle. A transmitter is provided in the vehicle for broadcasting an intrusion signal exterior to the vehicle in response to the monitoring device sensing the presence of the body within the vehicle. A remote vehicle interface device includes a two-way transceiver and an intrusion indicator. The two-way transceiver activates the intrusion indicator in response to the intrusion signal.

16 Claims, 2 Drawing Sheets

VEHICLE OCCUPANCY INTRUDER SECURITY SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to a vehicle occupancy intruder alert system, and more specifically, to a two-way communication intruder alert system for detecting the intruder and taking precautionary actions.

2. Description of the Related Art

Vehicle security systems have been utilized for deterring the theft of a vehicle and vehicle contents. Many vehicle security systems utilize perimeter alarm systems and/or ignition immobilization devices to deter the theft of the vehicle. The vehicle alarm systems provide a loud alarm within the vicinity of the vehicle to potentially scare the intruder off, as well as alerting the operator or bystanders within a listening distance that the vehicle has been broken into or is potentially being stolen. Ignition immobilization devices prevent vehicle operation unless an appropriate electronic tag is detected.

While theft deterrent devices such as immobilization devices temporarily incapacitate the vehicle, the safety of an operator of a vehicle may still be at risk should the operator of the vehicle or any other passenger return to the vehicle while an intruder is still within the vehicle. Immobilization devices work to prevent the theft of the vehicle and not necessarily warn the operator that the vehicle has been entered or that the intruder may potentially still be inside the vehicle. Even with the use of the perimeter alarm systems designed to scare off the intruder, an experienced intruder may be able to bypass or quickly deactivate the alarm system. Once triggered, the alarm may sound for a certain length of time but then deactivates due to battery capacity and other concerns. Thereafter, the operator may have a false sense of security when approaching the vehicle that the vehicle is safe for entry being that the alarm system is inactive. With the vehicle alarm system deactivated, the operator would have no way of knowing that the vehicle has been broken into by the intruder or that the intruder is potentially still in the vehicle since there is no other warning broadcast from the vehicle to operator away from the vehicle. Vehicle anti-theft devices such as alarm systems or immobilization devices are only one-way communication devices, and if deactivated, provides no viable options to warn the operator of danger or to allow the operator to take other precautionary actions such as to re-activate the alarm or to seek other assistance.

SUMMARY OF THE INVENTION

The present invention has the advantage of determining whether an intruder is present within a vehicle and provides an intrusion signal to a remote device carried by an operator of the vehicle for alerting the operator of the intruder's presence within the vehicle.

In one aspect of the invention, a vehicle security system includes a monitoring device for sensing the presence of a body within a vehicle. A transmitter is provided in the vehicle for broadcasting an intrusion signal exterior to the vehicle in response to the monitoring device sensing the presence of the body within the vehicle. A remote vehicle interface device includes a two-way transceiver and an intrusion indicator. The two-way transceiver activates the intrusion indicator in response to the intrusion signal.

DETAILED DESCRIPTION OF PREFERRED EMBODIMENTS

Figure 1:
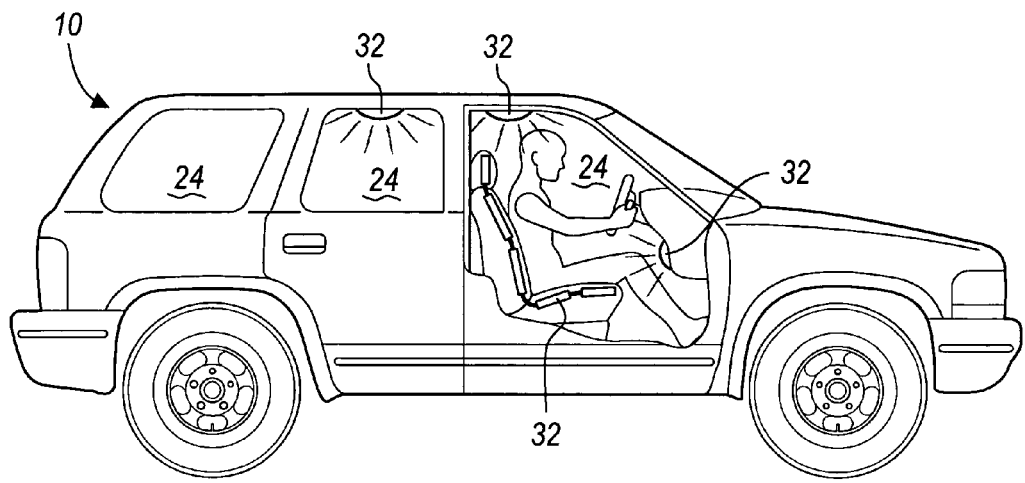
FIG. 1 is a perspective view of a vehicle incorporating an occupant intruder sensing system.

Referring now to the Drawings and particularly to FIG. 1, there is shown a vehicle 10 incorporating vehicle security system for detecting a presence of a body (i.e., an intruder) within the vehicle 10. The vehicle 10 is equipped with a monitoring device 12 (shown in FIG. 3) that senses the intruder within an interior compartment 24 after the vehicle 10 is parked and locked. The monitoring device 12 uses one or more sensors 32 to detect the presence of the intruder within the interior compartment 24. Various types of sensors are known to provide occupant sensing which may be used to detect the presence of an intruder. Such sensing systems include seat sensors that detect the presence of the intruder in the vehicle 10 by a person's weight or seating position. Ultrasonic ranging sensors use reflective properties of a surface of the object to detect location of the body. Active infrared sensors may also be used in a reflective manner to sense the intruder or passive infrared sensors for heat detection sensing. Other sensing systems include imaging or vision-based sensing systems, wave generator systems, vibration sensing systems, and capacitive sensing systems. Any of the described sensing systems may be used individually or in combination with one another to detect the presence of the intruder within the vehicle 10. The sensors 32 may be mounted in an overhead housing (e.g., overhead lamp housing), an instrument panel, vehicle seat, or any other interior trim panel.

Figure 2:
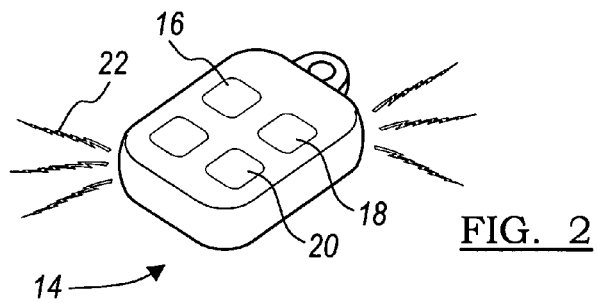
FIG. 2 is a perspective view an intruder alert RKE Fob according to a first embodiment of the present invention.

FIG. 2 shows a remote vehicle interface device such as a remote keyless entry (RKE) Fob 14 that typically broadcasts RF signals for unlocking and locking a vehicle. The remote vehicle interface device should be a device that is portable and will be carried by an operator of a vehicle 10 when outside and away from the vehicle 10. A vehicle lock switch 16 and a vehicle unlock switch 18 are commonly disposed on a face of the RKE Fob 14. The RKE Fob 14 comprises a two-way transceiver for receiving an intruder signal should the presence of the intruder be sensed after the vehicle 10 is parked and locked. The RKE Fob 14 further comprises an intrusion indicator 22, which is a warning indicator, to alert a person carrying the RKE Fob 14 that the presence of the intruder is detected within the vehicle 10. The intruder indicator 22 may comprise either a visual warning signal such as an illumination display button on the RKE Fob 14, an audible warning signal such as an audible tone or beeping, or a vibration warning signal. Furthermore, the intrusion indicator 22 may include a combination of warning signals selected from the group comprising the visual warning signal, the audible warning signal, and the vibration warning signal. In the preferred embodiment, the RKE Fob 14 is used as the remote vehicle interface device because many vehicle security features (i.e., door lock, unlock, panic alarm) currently exist within the RKE Fob 14 and modifications may easily be made to incorporate additional features. However, in other preferred embodiments, other devices such as vehicle messaging manager information terminals, configured wireless personal organizers, and other portable wireless communicable devices may be used as the remote vehicle interface device.

Figure 3:
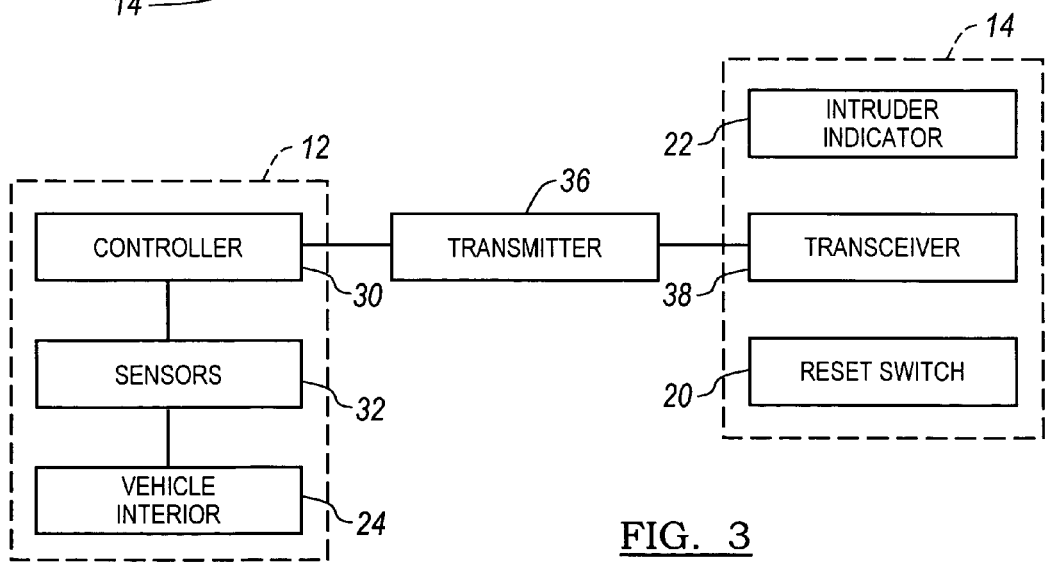
FIG. 3 is a block diagram of the occupant intruder sensing system according to a first embodiment of the present invention.
Figure 4:
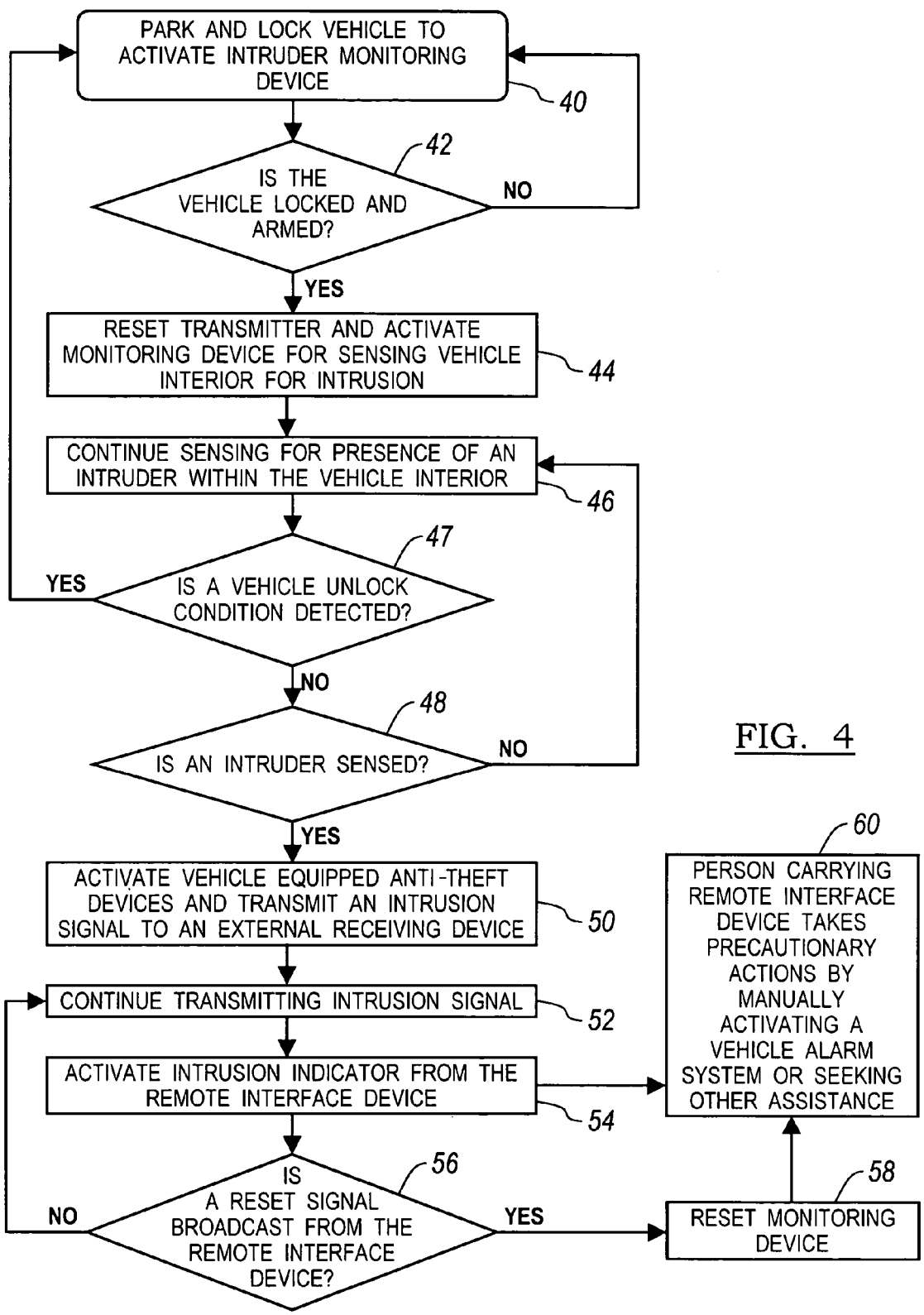
FIG. 4 is a flow chart for sensing an occupant intruder of a vehicle equipped with the occupant intruder sensing system.

FIG. 3 illustrates a block diagram of the vehicle security system for detecting the presence of the intruder and broadcasting the intruder signal to a remote device for alerting the operator of the vehicle 10. There is shown a monitoring device 12 for detecting the presence of the intruder in the vehicle 10. The monitoring device comprises a controller 30 for receiving sensed signals from one or more sensors 32 located within the vehicle interior 24. The sensors 32 as discussed earlier detect the presence of the intruder within a vehicle interior 24. The sensors 32 may be positioned to detect only the front passenger seat portion since the control elements (e.g., ignition switch) for starting the engine reside in close proximity to the instrument panel. Alternatively, the sensors 32 may be positioned throughout the vehicle including a rear seat passenger compartment (e.g., overhead panel, trim panel, seats) and a rear luggage compartment (i.e., for SUVs and vans) in the event an intruder is awaiting the return of the operator to the vehicle 10. The controller 30 awaits a sensed signal from each of the sensors 32 indicating that the intruder is present. When the sensors 32 indicate the presence of the intruder within the vehicle interior 24, the controller 30 will broadcast an intrusion signal to the RKE Fob 14 exterior to the vehicle 10 via a transmitter 36. The transmitter 36 is located on the vehicle 10. The transmitter 36 may be integrated within the monitoring device 12 or may be disposed separately from the monitoring device 12 and may interface with the controller 30 via a hard wire or a wireless transmission.

The RKE Fob 14 comprises a transceiver 38 for receiving the intrusion signal when the RKE Fob 14 is within broadcasting range of the vehicle 10. The transmitter 36 will continuously broadcast the intrusion signal until the monitoring device 12 is reset by the person controlling the RKE Fob 14. In the event the RKE Fob 14 is outside of the broadcast range of the transmitter, the RKE Fob 14 will receive the intrusion signal once the RKE Fob 14 is brought within the broadcasting range since the intrusion signal is continuously transmitted. Upon the person carrying the RKE Fob learns that an intruder may be present within the vehicle 10, he or she may acknowledge the warning and further verify whether the intruder is still within the vehicle by depressing a reset switch 20 located on the RKE Fob 14. Depressing the reset switch 20 activates a reset operation that halts the intrusion indicator 22 and broadcasts a reset signal which stops the transmitter 36 from broadcasting the intrusion signal. After a predetermined delay, the monitoring system 12 re-determines whether the sensors still sense the intruder within the vehicle interior 24. If the presence of the intruder is detected, the controller 30 signals the transmitter to broadcast the intrusion signal. Upon receiving the intrusion signal, the RKE Fob 14 will output the intrusion indicator 22 to alert the person carrying the RKE Fob. The person carrying the RKE Fob will be alerted that returning to the vehicle is not safe and may desire to take other precautionary actions to ensure their safety. Other precautionary actions may be to activate an audible anti-theft system (e.g., alarm or horn) on the vehicle, if not already activated, or to seek help from a local law enforcement, security or parking lot attendants.

Alternatively, because the RKE Fob 14 is overpopulated with numerous switches for features such as lock, unlock, alarm shutoff, and trunk release, it may be disadvantageous from an overpopulation and cost standpoint to add a separate reset switch 20 to the RKE Fob 14. To alleviate the addition of another switch on the face of the RKE Fob 14, the reset functionality may be implemented within the RKE Fob 14 by utilizing at least two existing switches. By implementing software changes to the control functions of the RKE Fob, the depression of two or more switches simultaneously or sequentially will provide the functionality of the reset operation.

Even if the intruder is still within the vehicle interior 24, the person carrying the RKE Fob may want to temporarily deactivate the intrusion indicator 22 (e.g., to save battery power). Also if the person carrying the RKE Fob is leaving the vehicle but a passenger known to them remains in the vehicle, the person carrying the RKE Fob may wish to temporarily deactivate the intrusion indicator from a nuisance perspective, since the passenger within the vehicle may be sensed as an intruder. A second simultaneous or sequential activation of multiple switches on the RKE Fob 14 may be used to temporarily deactivate the intrusion indicator 22 until the person decides to manually re-activate the system. The one or more switches may thereafter be used to re-activate the monitoring device 12 when desired. Furthermore, an unlock condition such as a remote control door open signal received from an unlock RKE Fob switch, a control door open signal received from a door unlock switch, a manual unlock operation (i.e., a door key in the door lock cylinder), an ignition key in the ignition switch, or biometric sensing (e.g., door unlocking/locking and engine start) may be used to de-activate the monitoring device 10 (e.g., vehicle security system) so that lawful entry to the vehicle may be made without the intruder signal and intruder indicator 22 being broadcast.

FIG. 3 illustrates a flow chart for a detecting the presence of a body within a vehicle equipped with a vehicle occupant intruder sensing system. In step 40, an operator parks and locks the vehicle. The locking of the vehicle activates the vehicle equipped anti-theft devices including the monitoring device for detecting the presence of the intruder. The monitoring device comprises one or more sensors positioned throughout the vehicle to detect entry into the vehicle by the intruder. In step 42, a determination is made whether the vehicle is locked and anti-theft devices are activated. If the determination is made in step 42 that the vehicle is not locked or anti-theft devices are not activated, a return is made to step 40 to await the activation of the vehicle lock and the anti-theft features.

In step 44, the monitoring device is initialized to clear any software flags indicating past intrusions and to initiate interior sensing of the vehicle interior for an intrusion. In step 46, the interior of the vehicle is continuously sensed for intruders. In step 47, a determination is made if an unlock signal is received requesting lawful entry of the vehicle. If an unlock signal is received, then a return is made to step 40 to await the locking of the vehicle to activate the intruder monitoring device. If a determination is made in step 47 that an unlock signal is not received, then a determination is made in step 48 whether an intrusion is detected. If the determination was made that the intrusion did not occur in step 48, then a return is made to step 46 to continuously sense for the intrusion. If the intrusion was detected in step 48, then predetermined alarm actions are activated in step 50 (e.g., honking horn or flashing lights). Also in step 50, the monitoring device broadcasts an intrusion signal to an external receiving device such as an RKE Fob. The RKE Fob comprises a two-way transceiver which receives the intrusion signal. In step 52, the intrusion signal is continuously broadcast throughout a broadcasting range. In step 54, the two-way transceiver receives the intrusion signal and outputs an intrusion indicator to the RKE Fob to notify the person carrying the RKE Fob of the intrusion. The intrusion indicator is a warning signal which may include an audible warning signal, a visual warning signal, or a vibration warning signal. The intrusion indicator may include only one of the warning signals or a combination of warning signals. The intrusion signal is continuously broadcast until an acknowledgement is received from the transceiver of the RKE Fob. To acknowledge receipt of the intrusion signal, the person carrying the RKE Fob depresses a dedicated reset switch button or depresses at least two buttons simultaneously or sequentially. The at least two buttons utilized for the reset operation may be buttons that are otherwise used for other vehicle functions such as door locks features, unlock features, alarm system, or trunk release.

In step 56, a determination is made whether the person carrying the RKE Fob has acknowledged the intrusive event. If the determination was made in step 56 that the person carrying the RKE Fob did not receive the acknowledgment, a return is made to step 52 to continue broadcasting the intrusion signal. If a determination was made that the person carrying the RKE Fob has acknowledged the intrusive event, then the monitoring device is reset in step 58. In step 58, after monitor device receives a signal from the transceiver of the RKE Fob requesting the reset operation, the monitoring device will terminate broadcasting the intrusion signal. The monitoring device will temporarily suspend sensing the vehicle for the intruder. Any flags associated in the software indicating the presence of the intruder will be cleared. The monitoring device will then activate the sensors after a predetermined delay to commence the sensing for the intruder. If the sensors detect the presence of the intruder, the monitoring device will broadcast the intrusion signal to the RKE Fob to alert the person carrying the RKE Fob that the intruder is still present within the vehicle interior. In step, 60, the person carrying the RKE Fob has the option of manually activating a vehicle alarm system or may desire to seek assistance from local law enforcement, security or a parking lot attendant. Alternatively, after the intrusion signal is received in step 54, the person carrying the RKE Fob may elect to proceed to step 60 for manually activating the vehicle alarm system or seeking other assistance as opposed to resetting the monitoring system to verify the presence of the intruder. If at any time an ignition key is placed in the ignition, then a determination is made that the driver is in the vehicle and is attempting to operate the vehicle and any subsequent locking of the vehicle while the key is in the ignition will not activate the intruder monitoring device. Furthermore any previous locking of the vehicle with a subsequent insertion of the ignition key into the ignition will deactivate the monitoring sensing device.

From the foregoing description, one ordinarily skilled in the art can easily ascertain the essential characteristics of this invention and, without departing from the spirit and scope thereof, can make various changes and modifications to the invention to adapt it to various usages and conditions. The usage of a two-way communication device, as described herein, allows the operator of the vehicle to interactively monitor the safety of the vehicle and to proceed to take safety precautions of their own choice while maintaining their safety.

What is claimed is:

1. A vehicle security system for a vehicle comprising:
 a monitoring device for sensing the presence of a body within said vehicle;
 a transmitter in said vehicle for broadcasting an intrusion signal exterior to said vehicle in response to said monitoring device sensing said presence of said body within said vehicle; and
 a remote vehicle interface device including a two-way transceiver and an intrusion indicator, said two-way transceiver activating said intrusion indicator in response to said intrusion signal wherein said intrusion indicator is activated without simultaneously initiating an activation of a vehicle alarm system on said vehicle, said remote vehicle interface device activating a reset operation, said transceiver broadcasting a reset signal to stop said transmitter from broadcasting said intrusion signal, and said monitoring device re-determining if said sensors sense said presence of said body within said vehicle in response to said reset signal.

2. The system of claim 1 wherein said remote vehicle interface device comprises a remote keyless entry (RKE) Fob.

3. The system of claim 1 wherein said intrusion indicator is an audible signal.

4. The system of claim 1 wherein said intrusion indicator is a visual signal.

5. The system of claim 1 wherein said intrusion indicator is a vibration signal.

6. The system of claim 1 wherein said intrusion indicator is selected from the group comprising an audible signal, a visual signal, and a vibration signal.

7. The system of claim 1 further including a manual alarm activation switch on said remote vehicle interface device, said manual alarm activation broadcasts an alarm activation signal to activate audible anti-theft devices.

8. The system of claim 1 wherein said monitoring device initiates said sensing for said occupant when at least one activation condition is present.

9. The system of claim 8 wherein said activation condition comprises a vehicle locked condition.

10. The system of claim 1 wherein said intrusion signal is re-broadcast to said remote vehicle interface device in response to said sensors sensing said presence of said body within said vehicle.

11. The system of claim 1 further comprising at least one switch on said remote vehicle interface device for activating said reset operation.

12. The system of claim 11 wherein said reset operation is activated in response to at least two switches activated simultaneously.

13. The system of claim 11 wherein said reset operation is activated in response to at least two switches activated sequentially.

14. The system of claim 1 wherein said transceiver receives said intrusion signal for indicating said presence of said occupant and transmits a reset signal for resetting said transmitter.

15. A method of sensing a presence of a body within a vehicle comprising the steps of:
- locking said vehicle;
- activating a monitoring system for detecting said presence of said body within said vehicle;
- sensing said presence of said body within said vehicle while said monitoring device is active; and
- providing an intrusion signal to a remote vehicle interface device exterior to said vehicle wherein said intrusion signal indicates said presence of said body within said vehicle, and wherein intrusion indicator is activated without simultaneously initiating an activation of a vehicle alarm system on said vehicle;
- resetting said monitoring device in response to a control action by a carrier of said remote vehicle interface device for temporarily suspending said sensing;
- broadcasting a reset signal by said remote vehicle interface device for resetting said monitoring device; and
- reactivating said sensing for said presence of said body by said monitoring device after a predetermined delay.

16. The method of claim 15 further comprising the step of:
- activating an intrusion indicator from remote vehicle interface device indicating said presence of said body.

* * * * *